US012524183B2

(12) United States Patent
Sharma et al.

(10) Patent No.: US 12,524,183 B2
(45) Date of Patent: Jan. 13, 2026

(54) DATA STORAGE DEVICE AND METHOD FOR PROVIDING VIDEO GRADE PERFORMANCE WITHOUT MEMORY OVERPROVISIONING OR USING EXTRA HARDWARE

(71) Applicant: Sandisk Technologies, Inc., Milpitas, CA (US)

(72) Inventors: Amit Sharma, Bangalore (IN); Dinesh Kumar Agarwal, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 70 days.

(21) Appl. No.: 18/672,327

(22) Filed: May 23, 2024

(65) Prior Publication Data

US 2025/0362831 A1    Nov. 27, 2025

(51) Int. Cl.
*G06F 3/06* (2006.01)
(52) U.S. Cl.
CPC .......... *G06F 3/0659* (2013.01); *G06F 3/0613* (2013.01); *G06F 3/0631* (2013.01); *G06F 3/0679* (2013.01)
(58) Field of Classification Search
CPC .... G06F 3/0659; G06F 3/0613; G06F 3/0631; G06F 3/0679
See application file for complete search history.

(56) References Cited

U.S. PATENT DOCUMENTS

| 7,546,426 B2 | 6/2009 | Shimada et al. |
| 9,348,749 B2 | 5/2016 | Choi et al. |
| 9,471,254 B2 | 10/2016 | Shaharabany et al. |
| 9,569,352 B2 | 2/2017 | Marcu et al. |
| 9,703,498 B1* | 7/2017 | Armangau ............ G06F 3/0659 |
| 10,102,119 B2 | 10/2018 | Gopinath et al. |
| 2005/0210218 A1* | 9/2005 | Hoogterp ............ H04L 67/1097 |
| | | 711/159 |
| 2010/0293328 A1* | 11/2010 | Kishi .................... G06F 12/084 |
| | | 711/170 |

(Continued)

OTHER PUBLICATIONS

Lu, Ning, In-Sung Choi, and Shin-Dug Kim. "A flash-aware write buffer scheme to enhance the performance of superblock-based NAND flash storage systems." Microprocessors and Microsystems 37.3 (2013): 345-357. (Year: 2013).*

(Continued)

*Primary Examiner* — Nicholas J Simonetti

(74) *Attorney, Agent, or Firm* — Crowell & Moring LLP

(57) ABSTRACT

A data storage device and method are disclosed for providing video grade performance without memory overprovisioning or using extra hardware. In one embodiment, a data storage device is provided comprising a memory and one or more processors. The one or more processors, individually or in combination, are configured to: receive a request from a host to perform a write operation in the memory; identify at least one partition of a plurality of partitions in the memory that does not require data reallocation during performance of the host write operation; and perform the host write operation in the at least one partition, wherein performing the host write operation in the at least one partition allows the write operation to be performed at a target write speed. Other embodiments are provided.

20 Claims, 11 Drawing Sheets

(56) References Cited

U.S. PATENT DOCUMENTS

2014/0189209 A1* 7/2014 Sinclair .................. G06F 3/065
                                                              711/103
2021/0311660 A1* 10/2021 Saxena ................ G06F 3/0659
2022/0035736 A1*  2/2022 Chiang ................ G06F 3/0656
2023/0359391 A1* 11/2023 Uttarwar ............... G06F 3/0604

OTHER PUBLICATIONS

Alsalibi, Ahmed Izzat, et al. "A survey of techniques for architecting SLC/MLC/TLC hybrid Flash memory-based SSDs." Concurrency and Computation: Practice and Experience 30.13 (2018): e4420. (Year: 2018).*

* cited by examiner

DATA STORAGE DEVICE AND METHOD FOR PROVIDING VIDEO GRADE PERFORMANCE WITHOUT MEMORY OVERPROVISIONING OR USING EXTRA HARDWARE

BACKGROUND

One type of data storage device is a video recording card, which can be used in cameras for video recording. As compared to other types of data storage devices, such as external/portable solid-state drives (SSDs), a video recording card is typically equipped with more hardware resources and memory provisioning to ensure that the video recording card can provide a target sustained sequential write (SSW) speed, which may be a requirement in camera/video applications.

DETAILED DESCRIPTION

Figure 1A:
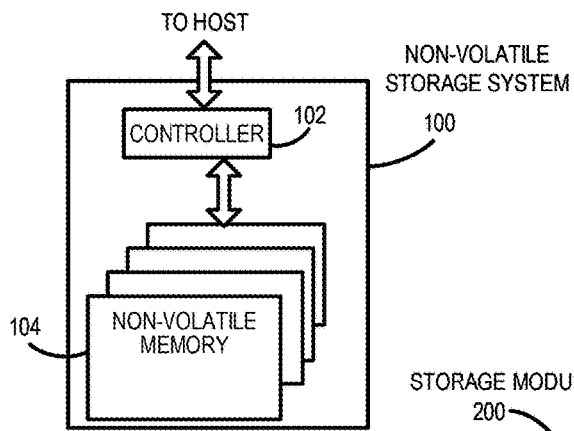
FIG. 1A is a block diagram of a data storage device of an embodiment.

The following embodiments generally relate to a data storage device and method for providing video grade performance without memory overprovisioning or using extra hardware. In one embodiment, a data storage device is provided comprising a memory and one or more processors. The one or more processors, individually or in combination, are configured to: receive a request from a host to perform a write operation in the memory; identify at least one partition of a plurality of partitions in the memory that does not require data reallocation during performance of the write operation; and perform the host write operation in the at least one partition, wherein performing the host write operation in the at least one partition allows the host write operation to be performed at a target write speed.

In some embodiments, the target write speed comprises a target sustained sequential write (SSW) speed.

In some embodiments, the target SSW speed comprises about 1100 megabytes per second (MBps).

In some embodiments, the write operation writes video data in the memory.

In some embodiments, the write operation is performed at the target write speed without overprovisioning the memory.

In some embodiments, the write operation is performed at the target write speed without using extra hardware resources.

In some embodiments, the write operation is performed at the target write speed without using a sanitization process to erase contents of the memory.

In some embodiments, the one or more processors, individually or in combination, are further configured to ensure that the at least one partition does not require data reallocation during performance of the write operation by: prior to receiving the request: monitor a free block count of the at least one partition; and in response to the free block count of the at least one partition being below a threshold, perform data reallocation on the at least one partition.

In some embodiments, the data storage device comprises an external/portable solid-state drive.

In some embodiments, the host comprises a camera.

In some embodiments, the memory comprises a plurality of memory dies.

In some embodiments, the memory comprises a multi-level cell (MLC) memory.

In some embodiments, the memory comprises a three-dimensional memory.

In another embodiment, a method is provided that is performed in a data storage device comprising a memory partitioned into first and second partitions. The method comprises: receiving, from a host, a request to perform a write operation in the memory; determining which, if any, of the first and second partitions needs data relocation; and in response to determining that the first partition, but not the second partition, needs data relocation: performing data relocation on the first partition; and performing the write operation in the second partition.

In some embodiments, the second partition is formed from a plurality of memory dies, and the write operation is performed using die parallelism.

In some embodiments, the method further comprises: prior to receiving the request from the host, performing data relocation on the second partition in response to a free block count of the second partition being below a threshold.

In some embodiments, the method further comprises: performing the write operation in both the first and second partitions in response to determining that neither of the first and second partitions needs data relocation:

In some embodiments, the data storage device comprises an external/portable solid-state drive.

In some embodiments, the host comprises a camera.

In yet another embodiment, a data storage device is provided comprises a memory configured to be partitioned into a plurality of partitions; and means for ensuring that at least one of the plurality of partitions is available to provide a predetermined sustained sequential write (SSW) speed without a need to perform an internal data relocation operation during a write operation.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1B:
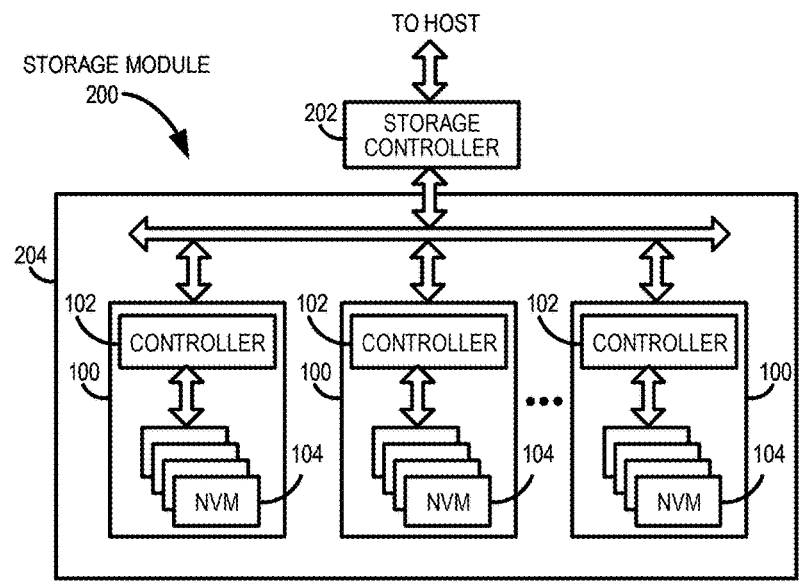
FIG. 1B is a block diagram illustrating a storage module of an embodiment.
Figure 1C:
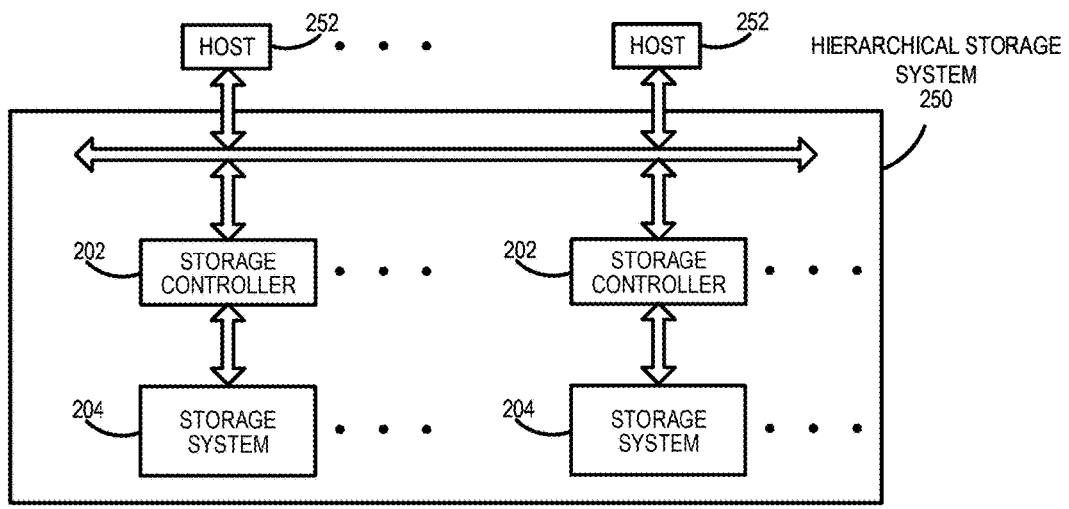
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
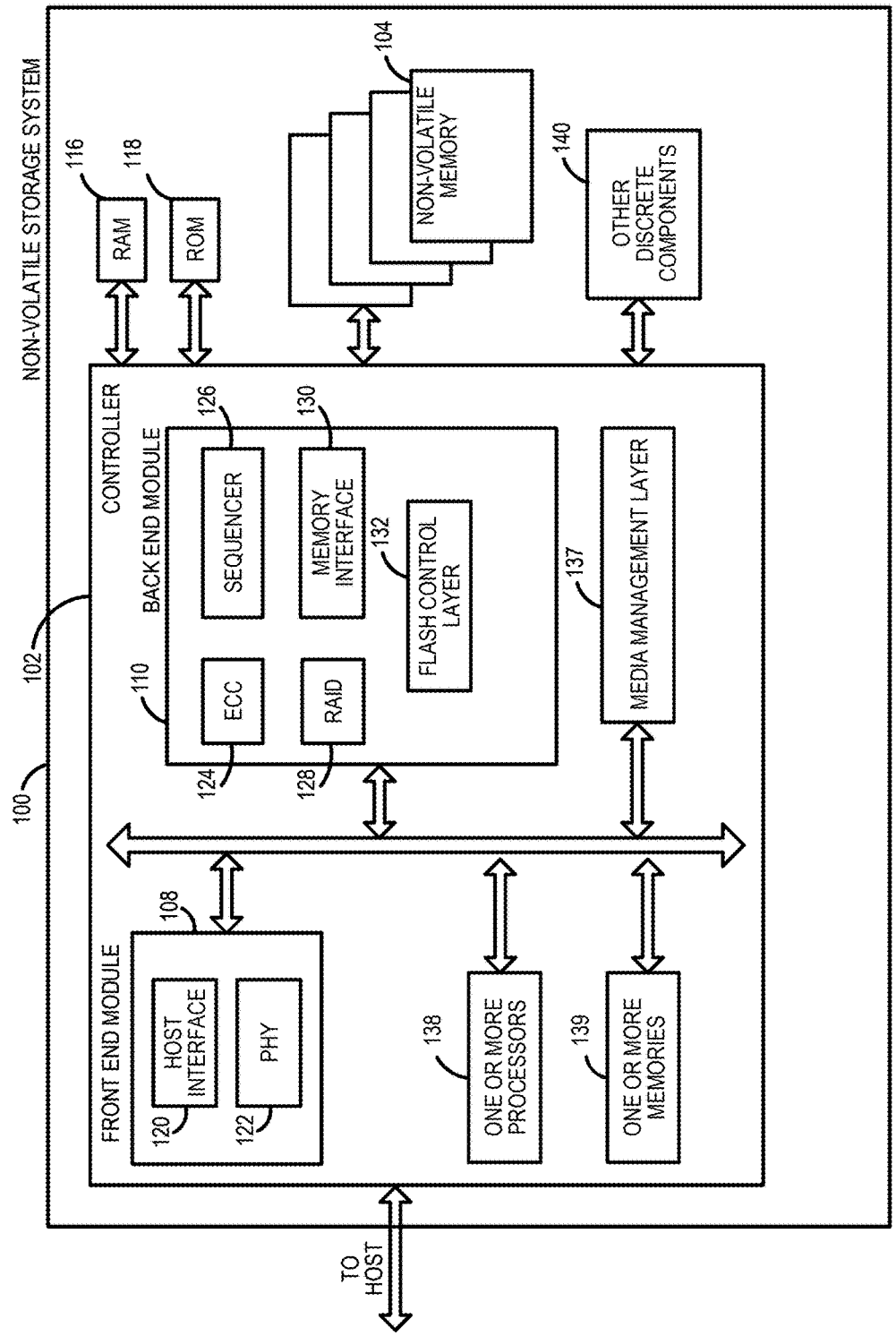
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
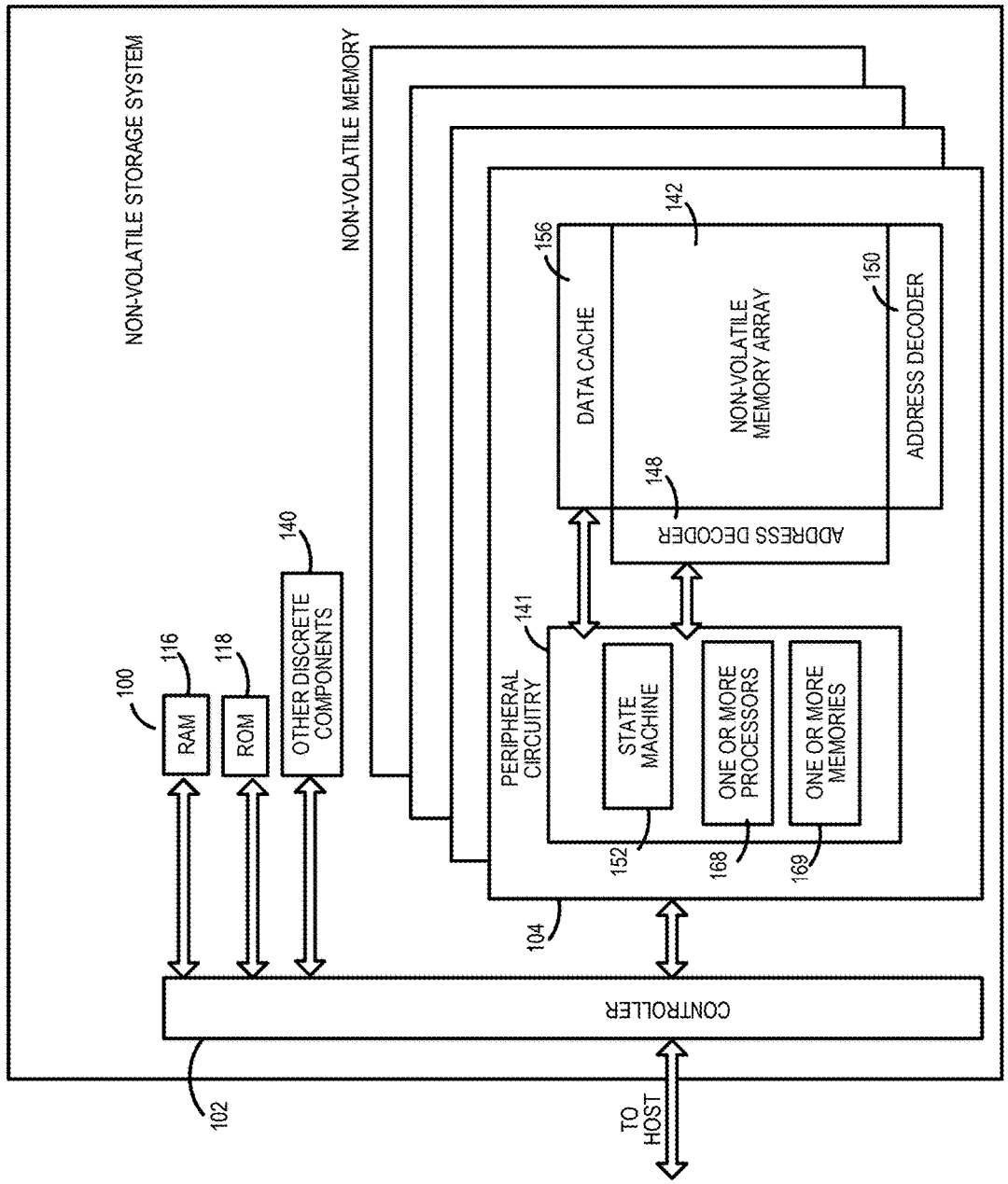
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
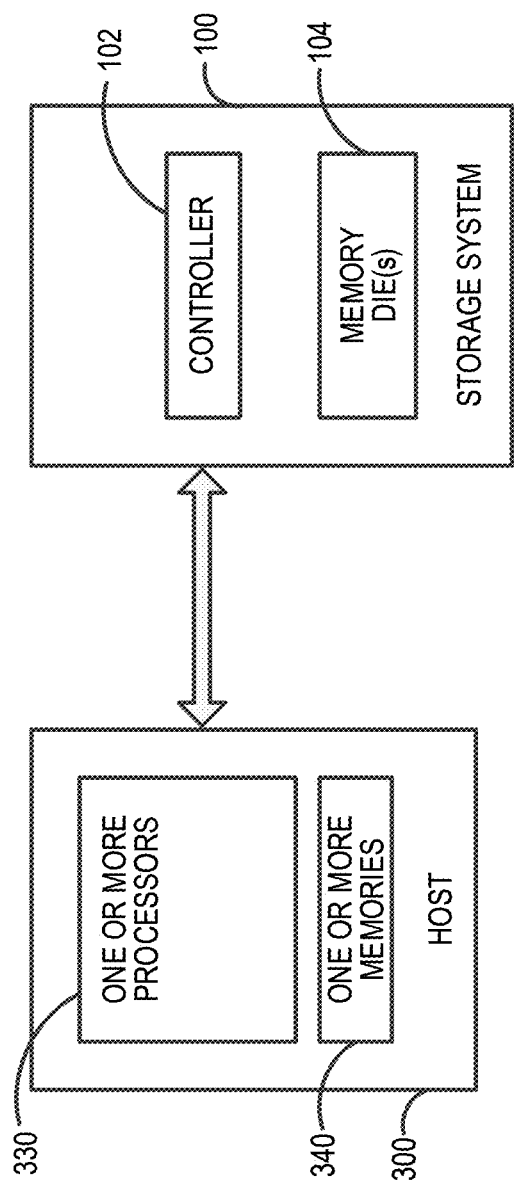
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Data storage devices, such as external/portable solid-state drives (SSDs), can be connected to different hosts using an interface, such as a USB interface. Such devices are popular and have a relatively-high sales volume. This product segment is typically highly cost sensitive and has certain requirements or expectations concerning sustained write of a sequential pattern (a "sustained sequential write (SSW) speed") (e.g., 1100 megabytes per second (MBps), cost (e.g., currently, a 2 TB portable SSD is priced around $150), and performance when the device is fragmented device (e.g., the device should perform respectably for a random write pattern on full device capacity). Performance of a fragmented device can be accelerated by additional hardware resources (e.g., RAM and direct memory access (DMA) modules). However, such additional resources can be relatively expensive and, thus, are often avoided to keep down the cost of the device.

Another popular type of data storage device is a video recording card (e.g., CFexpress-based VPG-400 memory card) used in cameras for video recording. There are several typical requirements for these types of cards. For example, because a camera (host) can perform semi-sequential writes with data invalidation in between, the data storage device can be expected to always give the published sustained write speed throughout the device's capacity (e.g., a VPG 400 card should have 400 MBps SSW). To guarantee this SSW-with-camera pattern, the memory card can have ample hardware resources and very large over provisioning in its memory, which a relatively-large number of memory blocks are not published as available memory capacity. Currently, this is a relatively-niche category where a user is willing to pay a premium for performance. Currently, a 2 TB memory card is priced around $500.

Due to the cost difference between SSDs and memory cards, many people plug an SSD into a camera using an adapter. However, some current external SSDs do not meet the relatively-strict requirements of video-recording-compatible memory cards. However, as noted above, current external SSDs may not meet the relatively-strict requirements of video-recording-compatible memory cards (e.g., 400 MBps with camera patterns). As such, current external SSDs may not meet the relatively-strict may be labeled as unsuitable for video recording.

The following embodiments can be used to allow a data storage device, such as an external SSD, to meet the VPG SSW write requirement without any additional hardware resources or memory capacity overprovisioning. In general, in one embodiment, the controller 102 of the data storage device 100 creates multiple logical partitions in the memory 104 and ensures that at least one partition can perform a host write without the need for internal operations (e.g., data relocation). These embodiments recognize that certain data storage devices fail a basic VPG400 test for several reasons. First, the camera host writes data and invalidates some of the data during the life cycle of the memory. Second, a fragmented device cannot allow host data writes without defragmenting it. In other words, host writes can only be allowed when certain amount of relocation operations have been completed. Third, a relocation operation has dependency on hardware resources (e.g., RAM, CPU speed, DMA speed). So, if the data storage device tries to optimize cost by cutting hardware resources, it will impact the speed of the relocation. Fourth, the data storage device has to anticipate errors, such as enhanced post-write read (EPWR) failures, where the data storage device might have to perform additional internal operations when the data storage device is already fragmented.

Traditional VPG cards ensure VPG400 performance by having enough hardware capabilities in terms of RAM, CPU, DMA speed, etc. Further, most memory cards on the market today are SLC-only solutions. Data in SLC memory can be written very fast, so even if relocation gets triggered, it can be performed multiple times faster than a multi-level cell (e.g., X3 (three bits per cell)) relocation (e.g., SLC program time is ~100 us whereas TLC program time is ~1.5 ms). Additionally, some solutions, such as CFexpress, attempt to use X3 blocks but have 50% overprovisioning in the X3 space. So, if the data storage device has 100×3 blocks, only 50 of them are counted in device capacity, and the remaining 50 are overprovisioned. Also, this solution has additional cost due to additional hardware resources and due to having 50% extra die capacity reserved for overprovisioning.

These embodiments recognize that these traditional methods of overprovisioning and using extra hardware resources may be cost-prohibitive for use in some data storage devices, such as SSDs. An example of this embodiment will now be discussed in the context of the data storage device 100 taking the form of an SSD and the memory 104 taking the form of 16 memory dies with a sustained write speed of 1100 MBps. It should be noted that this is merely an example, and the details provided herein should not be read into the claims unless expressly recited. A problem can occur when relocation starts, as the host speed reduces to ~200 MBps. This causes write operations on logical partition to be hindered until any ongoing relocation operations (involving the movement of device-internal data) are finished.

To overcome this problem, in one embodiment, the controller 102 of the data storage device 100 splits the memory dies into two logical groups or partitions instead of one. One logical partition is good enough to provide VPG400 kind of speed, and the controller 102 (e.g., via the flash translation layer (FTL)) can ensure that, at any point of time, at least one logical partition can work without performing an internal data relocation operation. The controller 102 can track a free block count in each partition and trigger relocation (e.g., defragmentation) in one partition at a time when the number of free blocks is below (or about to go below) a threshold.

Figure 4:
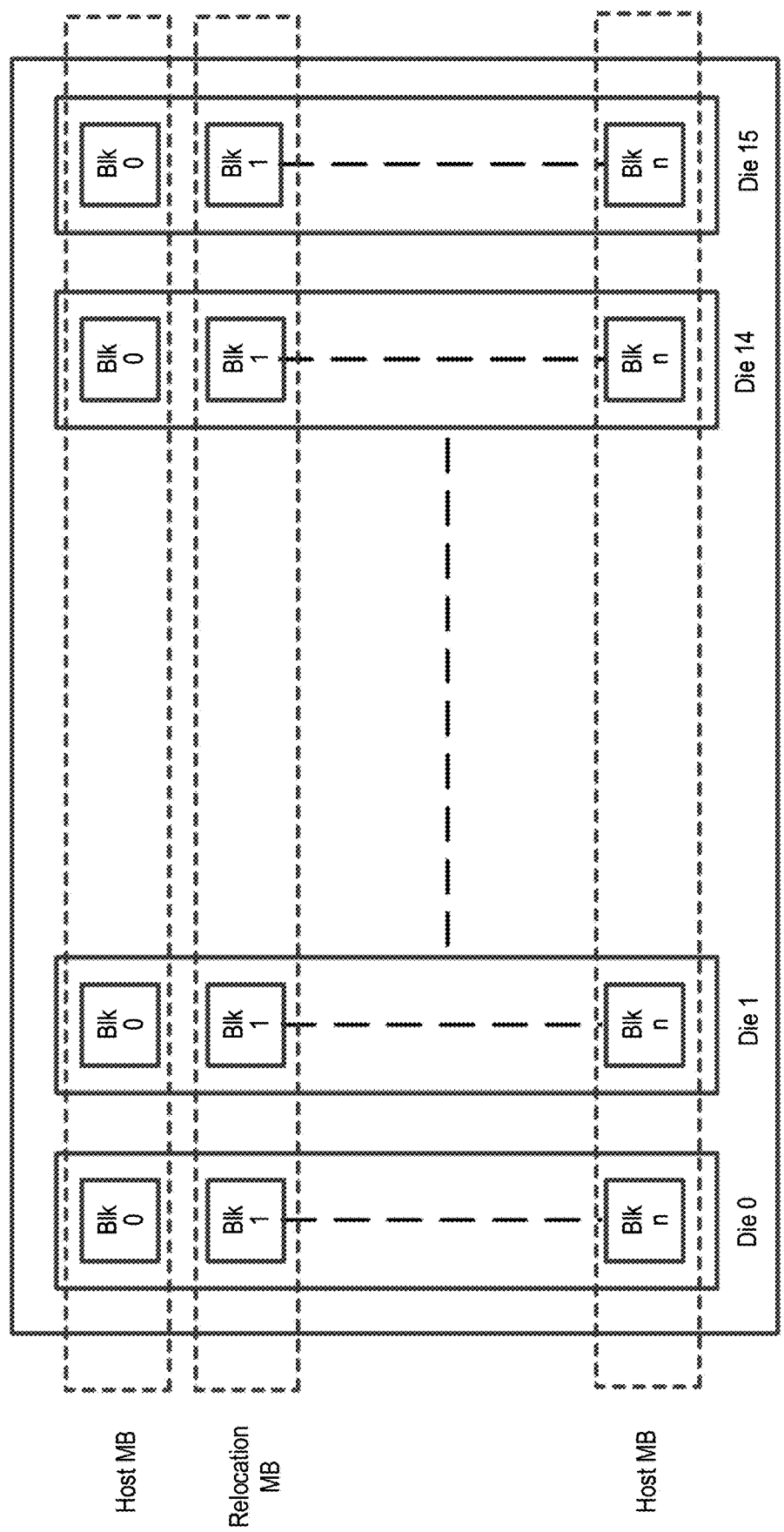
FIG. 4 is an illustration of a logical partition formation of an embodiment.
Figure 5:
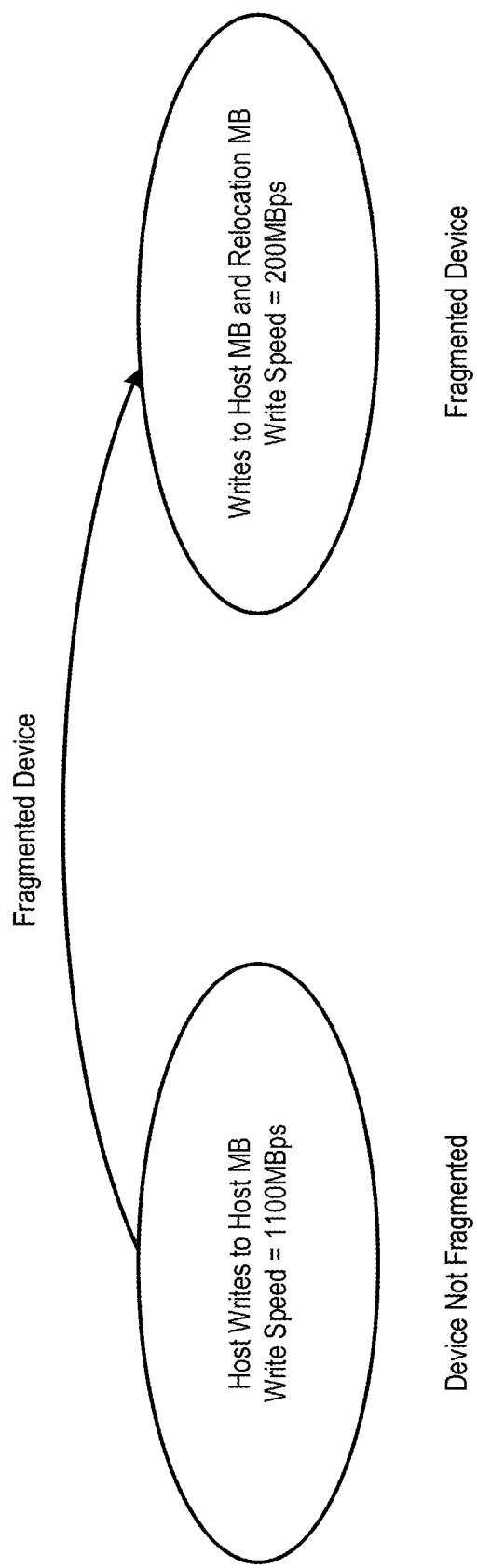
FIG. 5 is an illustration of a behavior of a data storage device of an embodiment.

FIGS. 4 and 5 illustrates the problem noted above. "MB" refers to a "metablock," which is a grouping of blocks across a plurality of memory dies. As shown in these drawings, in prior data storage devices, all memory dies need to work in the SSW stage, so they are grouped together to form one single logical partition. But once there is a need to perform an internal relocation/defragmentation operation, the write speed drops from 1100 MBps to 200 MBps while defragmenting the memory.

Figure 6:
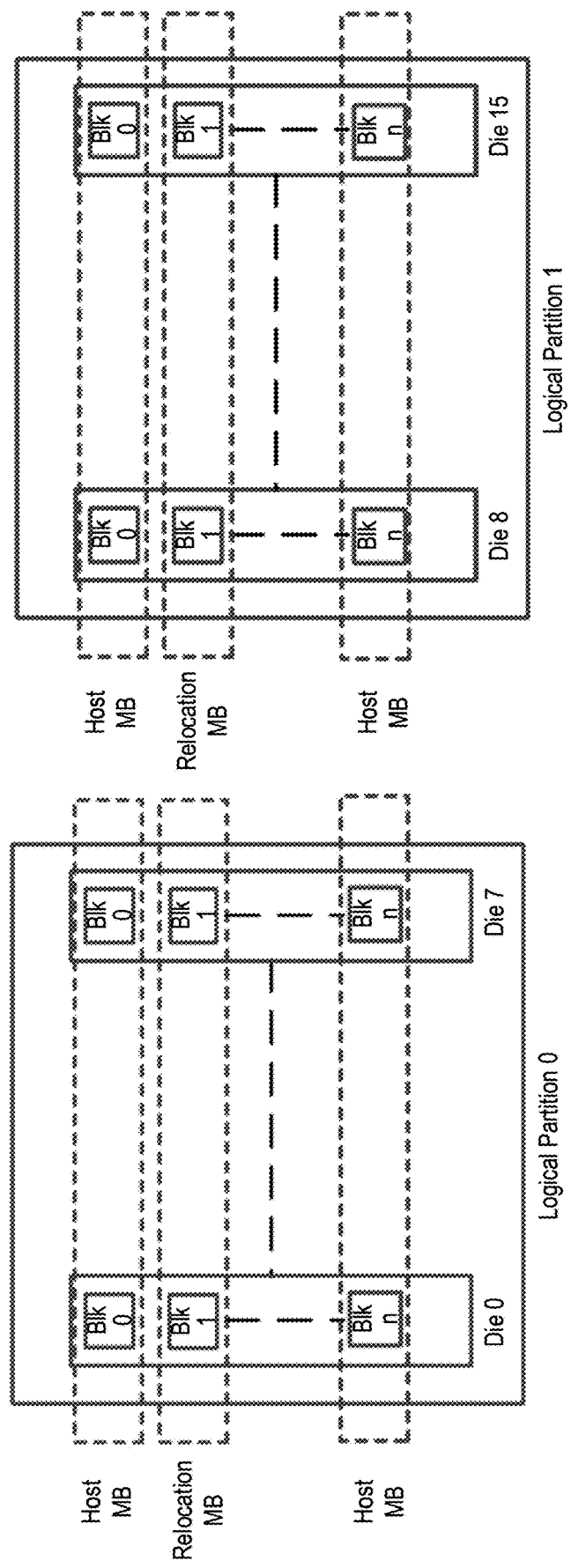
FIG. 6 is an illustration of a logical partition formation of an embodiment.

In contrast, as shown in FIG. 6, in this embodiment, the controller 102 internally creates two logical partitions (LP) when half of the memory dies are good enough to meet the VPG400 standard. The controller 102 ensures that at least one LP is free to preform host writes without performing relocation. As the controller 102 is aware of free blocks in both partitions, the controller 102 (e.g., the FTL) can schedule host write/relocation operations depending on state of each partition.

Figure 7:
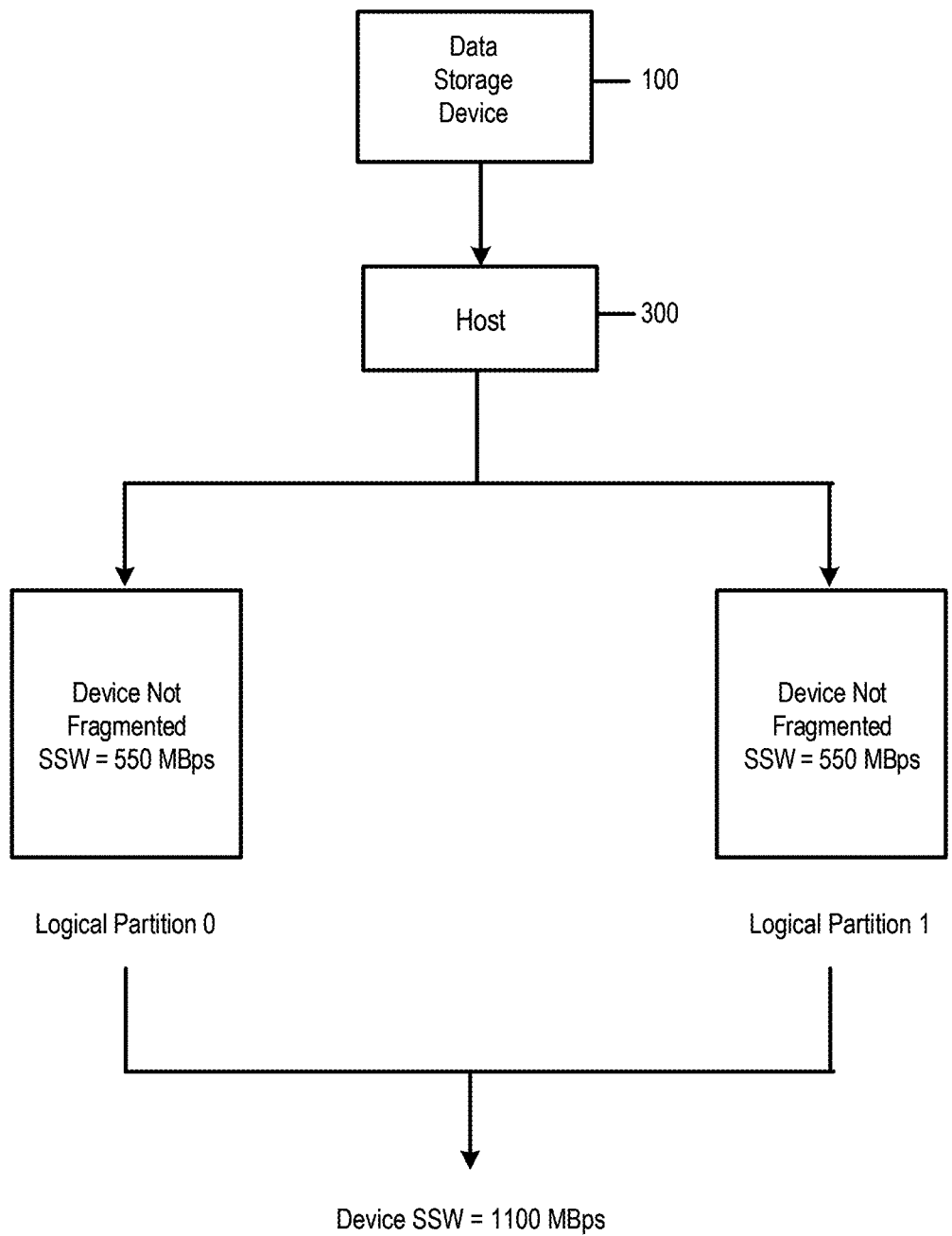
FIG. 7 is an illustration of sustained write functionality of an embodiment.
Figure 8:
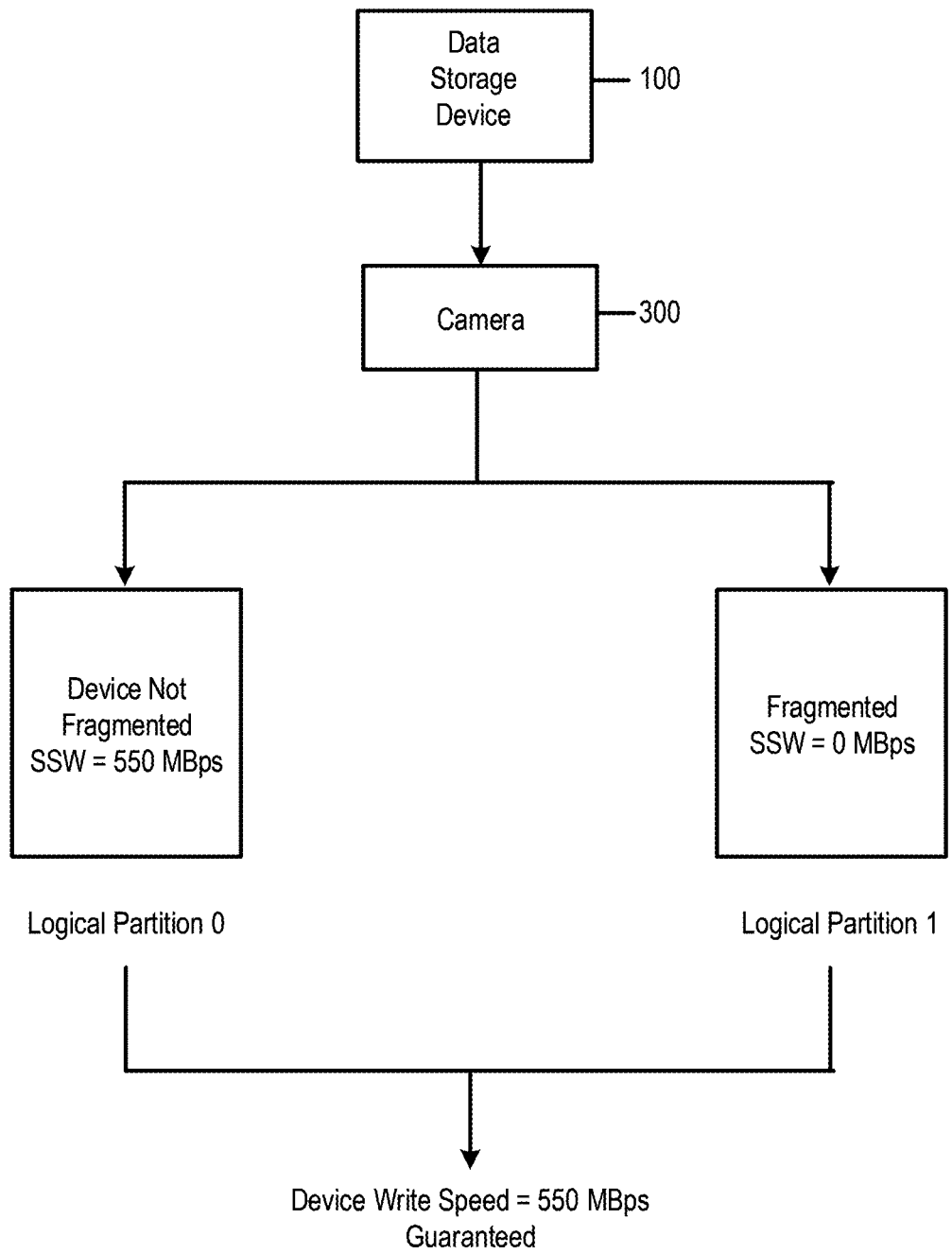
FIG. 8 is an illustration of sustained write functionality of an embodiment.

FIG. 7 illustrates a situation where the data storage device 100 is plugged into the host 300. As typical, the SSW benchmark does not fragment the data storage device 100, and the data storage device 100 would perform host writes on both logical partitions. Hence, the data storage device 100 would still give maximum write performance (e.g., 1100 MBps). However, when the data storage device 100 is connected to a camera host (resulting in fragmentation with VPG), using the prior approach can cause the speed to decrease to around 200 MBps. In contrast, as shown in FIG. 8, by using this embodiment, a minimum of VPG400 speed is ensured. As illustrated in this diagram, with this embodiment, when the memory 104 of the data storage device 100 is fragmented, the controller 102 can defragment one logical partition while performing a host write operations on the other partition in an uninterrupted fashion.

Figure 9:
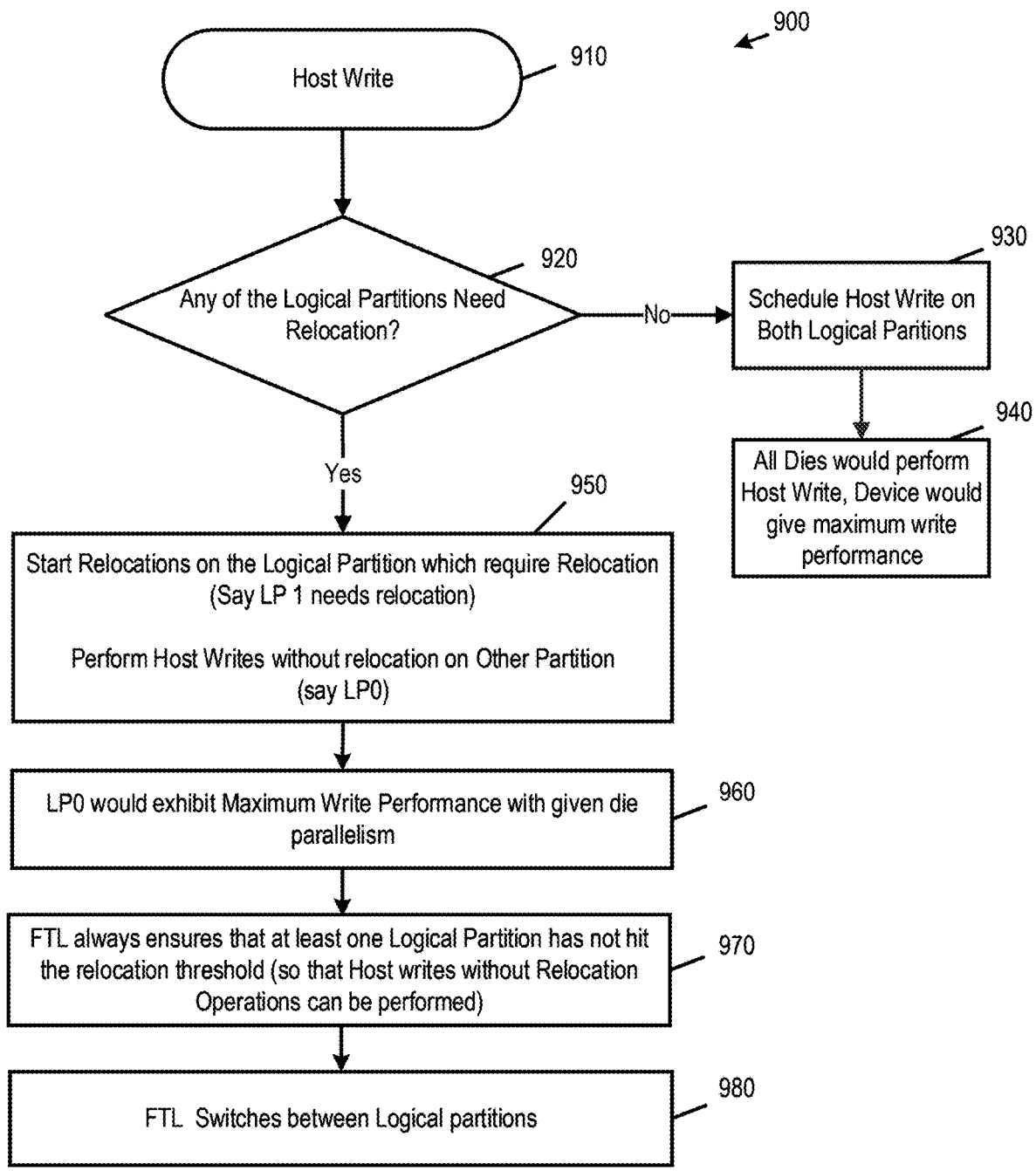
FIG. 9 is a flowchart of a method of an embodiment for providing video grade performance without memory overprovisioning or using extra hardware.

FIG. 9 is a flowchart 900 of a method of an embodiment for ensuring video grade performance. As shown in FIG. 9, after the controller 102 of the data storage device 100 receives a host write (910), the controller 102 determines if any of the logical partitions need relocation (920). If none of the logical partitions need relocation, the controller 102 schedules a host write on both logical partitions (930), and all memory dies would perform the host write, which would give maximum write performance (940). If any of the logical partitions need relocation, the controller 102 starts relocations of the logical partition that requires relocation (e.g., logical partition 1 (LP1)) and performs the host write without relocation on the other partition (e.g., LP0) (950). LP0 would exhibit maximum write performance with given die parallelism (960). The controller 102 (e.g., FTL) can ensure that at least one logical partition has not hit the relocation threshold, so that the host write can be performed without performing a relocation operation (970). The controller 102 (FTL) then switches logical partitions (960).

There are several advantages associated with these embodiments. For example, these embodiments can be used to allow an external SSD to be connected to a camera host and guarantee VPG performance without additional cost to the drive. The following chart summarizes this advantage:

|  | Without using this embodiment | With using this embodiment |
| --- | --- | --- |
| SSD as External Drive - SSW (No fragmentation) | 1100 MBps | 1100 MBps |
| SSD as Camera storage- VPG patterns causing fragmentation | 200 MBps (worst case) | 550 MBps guaranteed |

Figure 10:
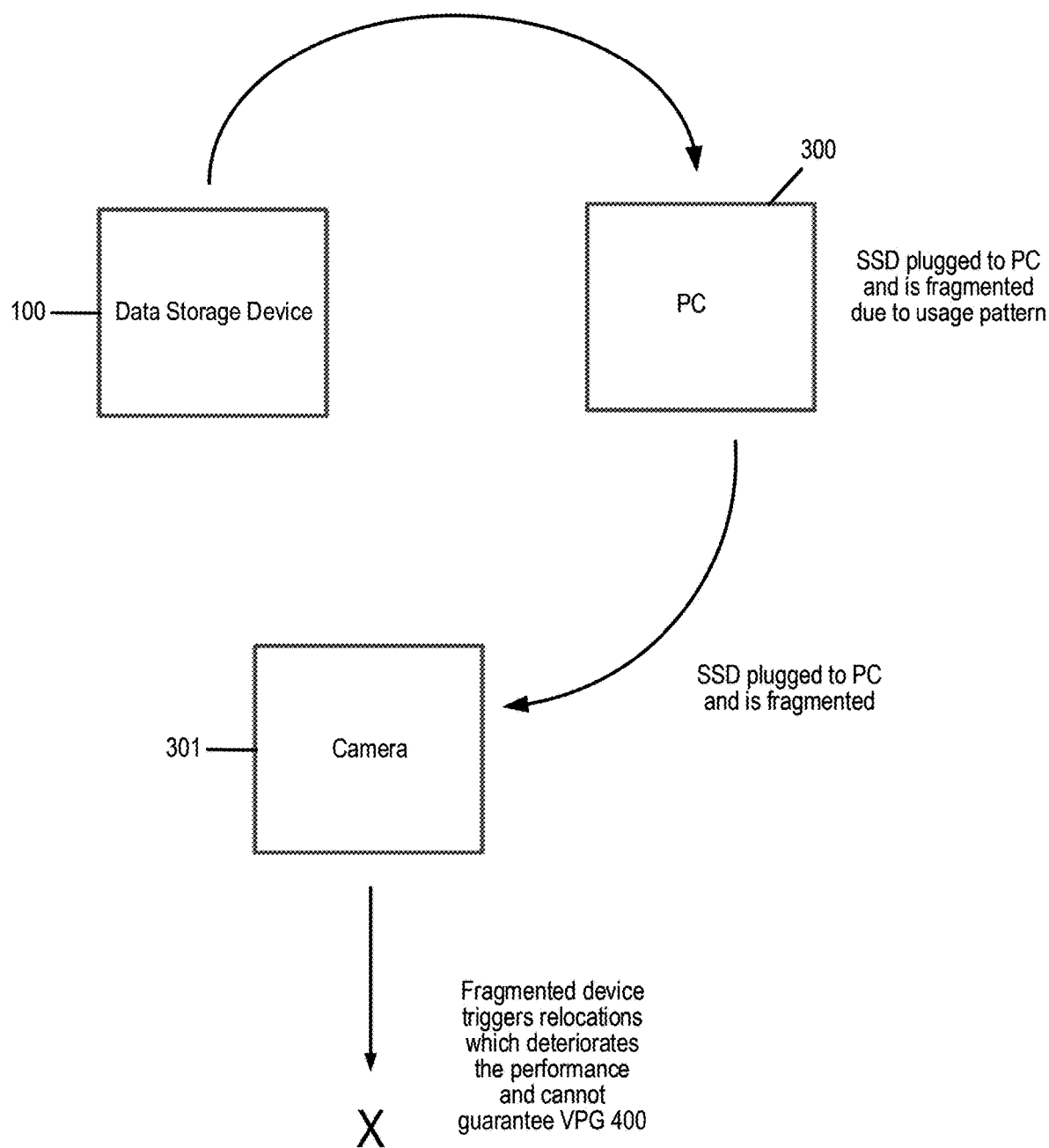
FIG. 10 is an ecosystem of an embodiment.

There are several other advantages associated with these embodiments. For example, a memory card (featuring X3 memory) can incorporate overprovisioning. However, in order to guarantee VPG400 performance, it may be necessary to eliminate the content of the memory card through sanitization procedures, which ensure that the memory card's fragmentation remains manageable within the existing overprovisioning. The memory card is designed to anticipate fragmentation caused specifically by the VPG pattern, rather than fragmentation stemming from random patterns written by the host. This is illustrated in FIG. 10. In a practical case, if data storage device 100 (e.g., SSD) is used with a host 300 (such as a personal computer (PC)) and then is used with a cameras host, all the content in the memory card is wiped out. However, in using these embodiments, the need of sanitization can be avoided.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a memory comprising a first partition and a second partition; and
    one or more processors, individually or in combination, configured to:
        ensure that a free block count of at least one of the first and second partitions does not fall below a reallocation threshold;
        receive a request from a host to perform a write operation in the memory;
        determine whether only one or both of the first and second partitions have a free block count that is above the reallocation threshold;
        in response to determining that both of the first and second partitions have a free block count that is above the reallocation threshold, using both the first and second partitions to perform the write operation, wherein the write operation is performed at faster than a guaranteed write speed; and
        in response to determining that only one of the first and second partitions has a free block count that is above the reallocation threshold:
            use the one of the first and second partitions that has a free block count that is above the reallocation threshold to perform the write operation, wherein the write operation is performed at the guaranteed write speed; and
            perform reallocation on the one of the first and second partitions that does not have a free block count that is above the reallocation threshold.

2. The data storage device of claim 1, wherein the guaranteed write speed comprises a guaranteed sustained sequential write (SSW) speed.

3. The data storage device of claim 2, wherein the guaranteed SSW speed comprises 550 megabytes per second (MBps).

4. The data storage device of claim 1, wherein the write operation writes video data in the memory.

5. The data storage device of claim 1, wherein the write operation is performed at the guaranteed write speed without overprovisioning the memory.

6. The data storage device of claim 1, wherein the write operation is performed at the guaranteed write speed without using extra hardware resources.

7. The data storage device of claim 1, wherein the write operation is performed at the guaranteed write speed without using a sanitization process to erase contents of the memory.

8. The data storage device of claim 1, wherein the data storage device comprises an external/portable solid-state drive.

9. The data storage device of claim 1, wherein the host comprises a camera.

10. The data storage device of claim 1, wherein the memory comprises a plurality of memory dies.

11. The data storage device of claim 1, wherein the memory comprises a multi-level cell (MLC) memory.

12. The data storage device of claim 1, wherein the memory comprises a three-dimensional memory.

13. A method comprising:
performing in a data storage device comprising a memory partitioned into first and second partitions:
  ensuring that a free block count of at least one of the first and second partitions does not fall below a reallocation threshold;
  receiving, from a host, a request to perform a write operation in the memory;
  determining whether only one or both of the first and second partitions have a free block count that is above the reallocation threshold; and
  in response to determining that only one of the first and second partitions has a free block count that is above the reallocation threshold:
    using the one of the first and second partitions that has a free block count that is above the reallocation threshold to perform the write operation, wherein the write operation is performed at a guaranteed write speed; and
    performing reallocation on the one of the first and second partitions that does not have a free block count that is above the reallocation threshold.

14. The method of claim 13, wherein the memory comprises a plurality of memory dies, and wherein the write operation is performed using die parallelism.

15. The method of claim 13, wherein the data storage device comprises an external/portable solid-state drive.

16. The method of claim 13, wherein the host comprises a camera.

17. The method of claim 13, wherein the write operation is performed at the guaranteed write speed without overprovisioning the memory.

18. The method of claim 13, wherein the write operation is performed at the guaranteed write speed without using extra hardware resources.

19. The method of claim 13, wherein the write operation is performed at the guaranteed write speed without using a sanitization process to erase contents of the memory.

20. A data storage device comprising:
a memory configured to be partitioned into a first partition and a second partition; and
means for:
  ensuring that a free block count of at least one of the first and second partitions does not fall below a reallocation threshold;
  receiving a request from a host to perform a write operation in the memory;
  determining whether only one or both of the first and second partitions have a free block count that is above the reallocation threshold;
  in response to determining that both of the first and second partitions have a free block count that is above the reallocation threshold, using both the first and second partitions to perform the write operation, wherein the write operation is performed at faster than a guaranteed write speed; and
  in response to determining that only one of the first and second partitions has a free block count that is above the reallocation threshold:
    using the one of the first and second partitions that has a free block count that is above the reallocation threshold to perform the write operation, wherein the write operation is performed at the guaranteed write speed; and
    performing reallocation on the one of the first and second partitions that does not have a free block count that is above the reallocation threshold.

* * * * *